(12) United States Patent
Wang et al.

(10) Patent No.: US 11,143,947 B2
(45) Date of Patent: Oct. 12, 2021

(54) SCREEN AND PROJECTION SYSTEM

(71) Applicant: Appotronics Corporation Limited, Shenzhen (CN)

(72) Inventors: Lin Wang, Shenzhen (CN); Fei Hu, Shenzhen (CN); Wei Sun, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 17/040,123

(22) PCT Filed: Dec. 3, 2018

(86) PCT No.: PCT/CN2018/118833
§ 371 (c)(1),
(2) Date: Dec. 23, 2020

(87) PCT Pub. No.: WO2019/179166
PCT Pub. Date: Sep. 26, 2019

(65) Prior Publication Data
US 2021/0191249 A1      Jun. 24, 2021

(30) Foreign Application Priority Data

Mar. 22, 2018   (CN) .......................... 201810238984.5

(51) Int. Cl.
*G03B 21/602* (2014.01)
*G02B 5/02* (2006.01)

(52) U.S. Cl.
CPC ......... *G03B 21/602* (2013.01); *G02B 5/0284* (2013.01)

(58) Field of Classification Search
CPC .... G03B 21/60; G03B 21/602; G02B 5/0284; G02B 5/04; G02B 5/045
(Continued)

(56) References Cited

U.S. PATENT DOCUMENTS 3,893,748 A * 7/1975 De Palma .............. G03B 21/60
359/455
5,096,278 A * 3/1992 Yoshioka ............. G03B 21/602
359/459

(Continued)

FOREIGN PATENT DOCUMENTS

| CN | 1734290 | 2/2006 |
| CN | 204009344 | 12/2014 |

(Continued)

*Primary Examiner* — Christopher E Mahoney
(74) *Attorney, Agent, or Firm* — ScienBiziP, P.C.

(57) ABSTRACT

A screen comprises the following layers sequentially stacked from an incident side of projected light rays: a micro-lens layer, a transparent matrix layer, a total internal reflection layer, and a light-absorbing layer. The light-absorbing layer absorbs light passing through the micro-lens layer, the transparent matrix layer and the total internal reflection layer. The micro-lens layer comprises a plurality of micro-lens units. The total internal reflection layer comprises a plurality of microstructure units. The microstructure unit has a lower first flat surface and an upper second flat surface. The first flat surface intersects the second flat surface The micro-lens units and the microstructure units are at least partially arranged in an alternating manner. The projected light rays converged toward the first flat surface exit after being totally reflected by the first flat surface and the second flat surface sequentially.

20 Claims, 14 Drawing Sheets

(58) Field of Classification Search
USPC .......................................................... 359/459
See application file for complete search history.

(56) References Cited

U.S. PATENT DOCUMENTS

| | | | |
|---|---|---|---|
| 10,656,513 B2* | 5/2020 | Zhou .................... | G03B 21/602 |
| 2005/0275952 A1 | 12/2005 | Odagiri et al. | |
| 2010/0091365 A1* | 4/2010 | Shiau ..................... | G03B 21/56 |
| | | | 359/448 |
| 2014/0092471 A1 | 4/2014 | Sadahiro et al. | |
| 2015/0362832 A1* | 12/2015 | Chuang ................ | G03B 21/602 |
| | | | 359/455 |
| 2020/0387061 A1* | 12/2020 | Wang .................... | G02B 5/0284 |
| 2020/0401034 A1* | 12/2020 | Wang ..................... | G02B 5/003 |
| 2021/0026231 A1* | 1/2021 | Wang ..................... | G02B 5/045 |

FOREIGN PATENT DOCUMENTS

| | | |
|---|---|---|
| CN | 207216263 | 4/2018 |
| JP | 2014199375 | 10/2014 |

* cited by examiner

SCREEN AND PROJECTION SYSTEM

TECHNICAL FIELD

The present disclosure relates to a screen, and specifically, to a projection system and a projection screen capable of improving the utilization of projection light rays and having a high contrast.

BACKGROUND

In recent years, the emergence of ultra-short-throw projectors is a major advancement in the field of projection. The ultra-short-throw projector has a very short throw ratio. Its appearance means that the situation of blocking the picture due to the movement of people or the placement of objects during the projection will no longer exist. In addition, the projection system using the ultra-short-throw projector is small in size, easy to install, and the whole system is low in price, and can easily achieve a projected image larger than 100 inches in a small projection distance. Therefore, in the application of large-size home theater, the projection display system has more advantages than LCD (Liquid Crystal Display) TV (Television).

In such a projection system, in addition to the projector, the screen is an important factor affecting the effect of the projected image. The image contrast is an important parameter to evaluate the quality of the screen in the projection display of the screen. Usually, the contrast of the projector can reach thousands to one. But in practical household applications in a living room or the like, ambient light will have a relatively strong influence on the contrast of the screen image, and the normal projection screen can reflect the projection light rays and the ambient light, causing the contrast to drop seriously which greatly affects viewing experience. Therefore, there is a need to reduce the adverse effects of the ambient light on the projection display by technical means to bring the projected image relatively high contrast, so as to improve the display quality.

In order to improve the screen contrast when there is a large amount of ambient light, most of the current anti-ambient light projection screens adopt the technical solution of array microstructures plus a light reflection layer or a light absorbing layer. For example, FIG. 1 shows an anti-ambient light projection screen 100 proposed by the present inventors before. As shown in FIG. 1, the projection screen 100 is provided with a transparent substrate layer 101, a total internal reflection layer 102 and a light absorbing layer 103 which are stacked. The total internal reflection layer 102 is provided with microstructure units capable of causing specific incident light rays to be totally internally reflected twice continuously. A plurality of microstructure units is provided in the total internal reflection layer 102 to form a structure of sawtooth shape. A part of the incident projection light rays is totally internally reflected by the total internal reflection layer 102 and then enters the viewer's eyes to form an image, while another part passes through the total internal reflection layer since it does not meet the optical conditions for total internal reflection in the total internal reflection layer, and then is absorbed by the black light-absorbing layer 103 on the back side of the screen and finally lost. Generally, the projection screen shown in FIG. 1 has a light energy utilization rate of only about 50% for projection light rays of a projector.

It can be seen that the above existing projection screens lose a lot of projection light rays in the process of distinguishing the projection light rays from the ambient light, resulting in low utilization efficiency of the projection light rays, and it is difficult to obtain a bright display image.

SUMMARY

In view of the above problems, the present disclosure intends to provide a screen which has a high contrast and is capable of improving the light energy utilization rate and a projection system contains this kind of screen.

The first embodiment of the present disclosure provides a screen. The screen is capable of reflecting the projection light rays from the projector into a field of view of a viewer, wherein the screen comprises a microlens layer, a transparent substrate layer, a total internal reflection layer and a light absorbing layer which are sequentially stacked from an incident side of the projection light rays, wherein the light absorbing layer is capable of absorbing light transmitted through the microlens layer, the transparent substrate layer and the total internal reflection layer; the microlens layer comprises a plurality of microlens units; the total internal reflection layer comprises a plurality of microstructure units, each of which has a first plane on the lower side and a second plane on the upper side, wherein the first plane intersects with the second plane, and the plurality of microstructure units form a structure of a sawtooth shape; and the microlens units are at least partially interlaced with the microstructure units such that the microlens units converge at least a portion of the projected light onto the first plane, and the portion of the projection light rays converged onto the first plane exits after two consecutive total internal reflections on the first plane and the second plane.

Preferably, the total internal reflection layer has a rotationally symmetric structure corresponding to a rotationally symmetric structure of the microlens layer. Preferably, a rotation center axis of the total internal reflection layer and the rotation center axis of the microlens layer are both perpendicular to a plane of the screen and can be located below the screen.

Preferably, the microlens layer has a rotationally symmetric structure of arc-shape.

The focal length of the microlens unit is f, a distance in direction of an optical axis between an intersection point of an arc of microlens unit with an optical axis of the microlens unit and an intersection line of the first plane and the second plane is d, and f and d satisfy a relationship of f<3d preferably. More preferably, f≈d.

The screen is further provided with a light diffusing layer, which is a microstructure diffusion layer provided on at least one of the first plane and the second plane of the microstructure unit; or, the light diffusing layer is an optical diffusing film provided on an incident side for the projection light rays of the microlens layer.

Preferably, the light absorbing layer is a black material layer absorbing light.

Preferably, the microlens layer, the transparent substrate layer and the total internal reflection layer are integrally formed from the same PET substrate. Alternatively, the materials of the microlens layer, the transparent substrate layer, and the total internal reflection layer are different from each other.

The screen can further comprises an inner layer located between the total internal reflection layer and the light absorbing layer, and having a structure of a sawtooth shape that matches the microstructure unit of the total internal reflection layer. A refractive index $n_1$ of the total internal reflection layer and a refractive index $n_2$ of the inner layer satisfy a relationship: $n_2<n_1-0.2$. For example, the inner layer can be an air layer, a quartz layer or a glass layer.

Preferably, the individual microstructure unit of the total internal reflection layer are provided as rotationally symmetric total internal reflection prisms, and angles of the two intersection planes of the microstructure unit with a plane of the screen are $\theta_1$ and $\theta_2$, respectively, which satisfy a relationship of $\theta_1+\theta_2<90$.

Preferably, in the plurality of microstructure units, each $\theta_1$ is different angle, and all $\theta_2$ are equal to 45 degrees. Alternatively, in the plurality of the microstructure units, each of the $\theta_1$ is a different angle from others, and each of the $\theta_2$ also is a different angle from others.

According to the second embodiment of the present disclosure, a projection system is provided, and the projection system comprises a projector and the screen mentioned above.

According to the description above, the present screen and projection system have at least the following advantages:

By arranging a total internal reflection layer with an array structure on the surface of the total internal reflection layer, the optical path of the projection light rays that are incident at a large incident angle is changed, so that most of the projection light rays satisfies the condition of total internal reflection on both the two inclined planes of a microstructure unit of the total internal reflection layer, and thus can be reflected into the field of view of a viewer after two consecutive total internal reflections, which effectively improves the screen's utilization efficiency of projection light rays.

The microlens layer significantly improves the reflection efficiency of the projected light rays, so that a higher screen gain can be obtained.

The light rays collimated by the total internal reflection layer exits with a larger diffusing angle by providing the diffusing layer, which enlarges the effective viewing angle of the screen.

It should be understood that beneficial effects of the present disclosure are not limited to the above-mentioned effects but may be any beneficial effects described herein.

DESCRIPTION OF EMBODIMENTS

Figure 1:
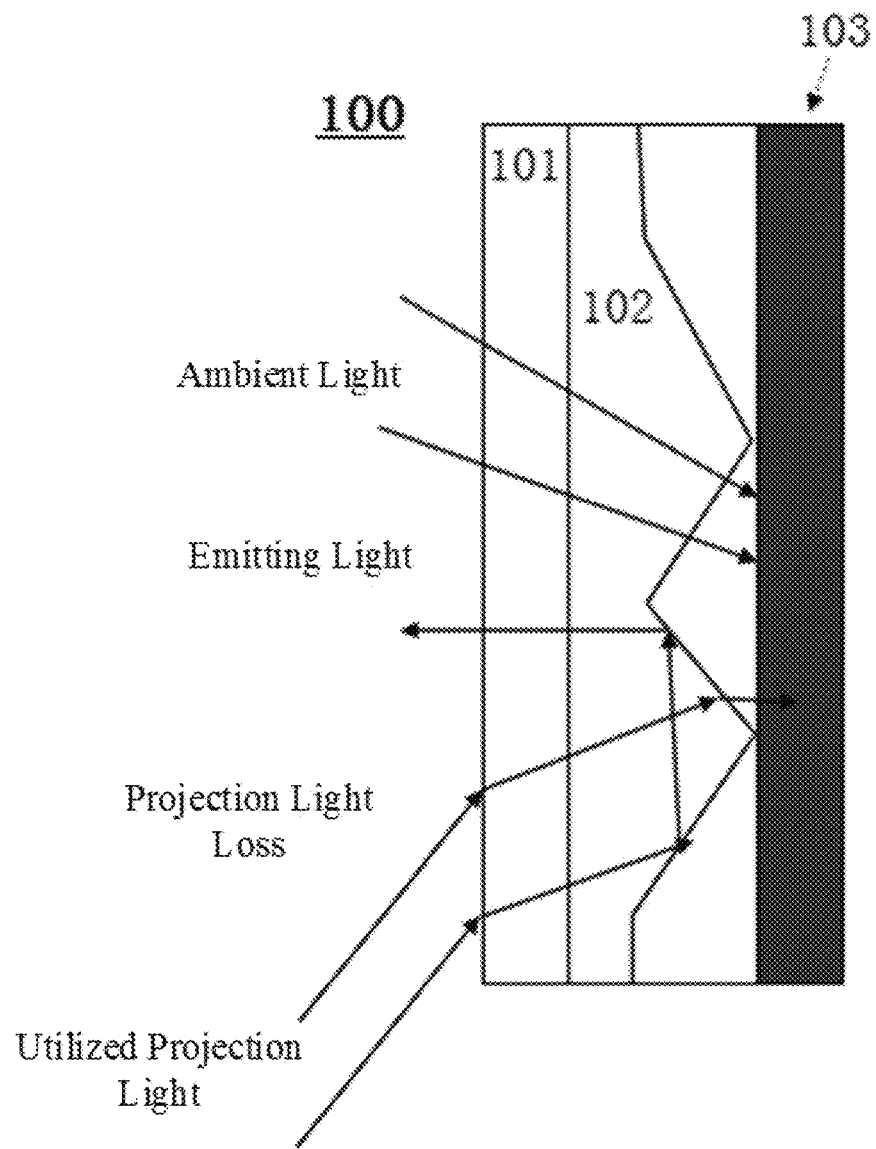
FIG. 1 is a schematic view showing an example of a projection screen in the related art.

Hereinafter, specific embodiments according to the present disclosure will be described in detail with reference to the drawings. It should be emphasized that all dimensions in the drawings are only schematic and are not necessarily shown in real scale, and thus are not limitative. For example, it can be understood that sizes, thicknesses, ratios, angles or the like of various layers in the multi-layered structure of the projection screen are not shown according to actual dimensions and ratios, but only for a convenience of illustration.

Structure Description of a Total Internal Reflection Screen

Figure 2:
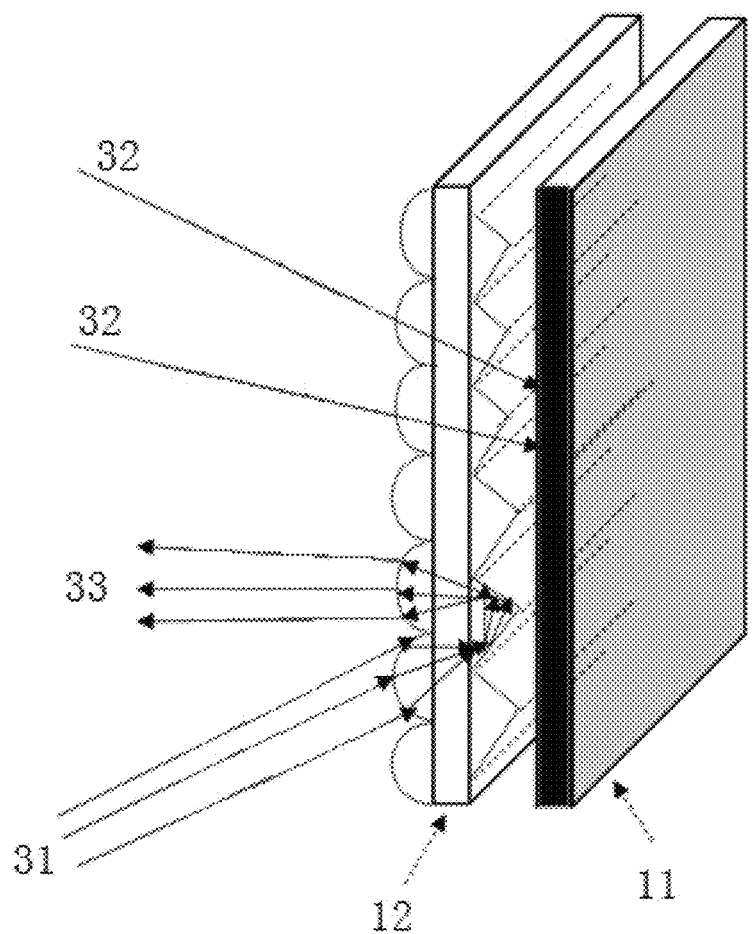
FIG. 2 is a structural schematic view of a screen according to the present disclosure.

FIG. 2 is a schematic view of the structure of a projection screen according to an embodiment of the present disclosure. As shown in FIG. 2, the screen 10 comprises a light absorbing layer 11 and an optical function layer 12 stacked in sequence, and the optical function layer 12 is located on the incident side of the projection light rays of the projector (not shown) and opposite to the light absorbing layer 11. Hereinafter, the incident side of the projection light rays of the screen 10 is also referred to as the outer side of the screen (i.e., the side facing the audience), and the side of the light absorbing layer is referred to as the inner side of the screen (i.e., the side away from the audience).

Figure 3:
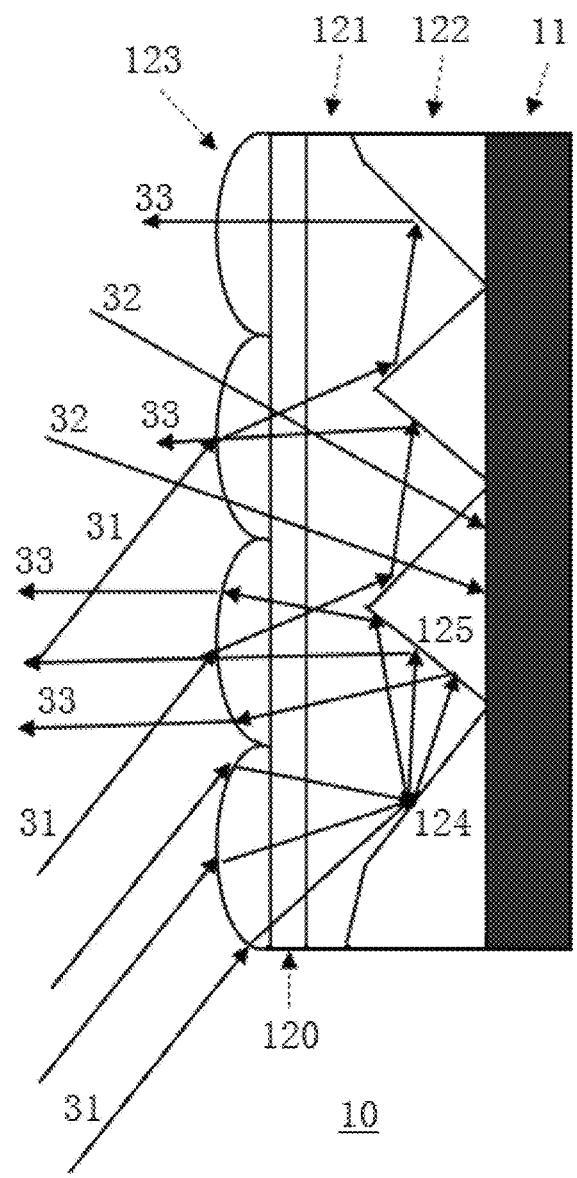
FIG. 3 is a cross-sectional schematic view of the stacked structure of a screen according to the present disclosure.

FIG. 3 shows a cross-sectional schematic view of the specific structure of the optical function layer 12 of the screen according to an embodiment of the present disclosure. As shown in FIG. 3, the optical function layer 12 comprises a microlens layer 123, a transparent substrate layer 120, a total internal reflection layer 121 and an inner layer 122 that are sequentially stacked from the incident side of the projection light rays. The transparent substrate layer 120 can be formed of transparent material such as PET, PC, or PMMA. The microlens layer 123 is formed on the incident side for the projection light rays of the transparent substrate layer 120, and the total internal reflection layer 121 is provided on the side of the transparent substrate layer 120 opposite to an incident side of the projection light rays. The inner layer 122 is formed on a side of the total internal reflection layer 121 close to the light absorbing layer 11 and is in contact with the light absorbing layer 11. The refractive index of the material forming the inner layer 122 is lower than the refractive index of the material forming the total internal reflection layer 121.

The total internal reflection layer 121 is provided with a plurality of microstructure units. Each microstructure unit can be formed as a total internal reflection prism. The microstructure unit shows in FIG. 3 has a triangular cross-sectional structure. In addition, the microstructure unit can also have a cross-sectional structure of other shapes such as a trapezoid. Each microstructure unit comprises two inclined intersecting planes 124 and 125. The inclined plane 124 on the lower side corresponds to the first plane in the present disclosure, and the inclined plane 125 on the upper side corresponds to the second plane in the present disclosure. The inclination angles of the two inclined planes are precisely designed (to be described in detail later), so that at least most of the projection light rays 31 incident from below the screen 10 are totally internally reflected at the two inclined planes and finally becomes the outgoing light rays 33 that is reflected to the field of view of a viewer and most of the ambient light 32 coming from the top of the screen 10 have angles which cannot satisfy the total internal reflection condition, and thus pass through the optical function layer 12 and are absorbed by the light absorbing layer 11. The two intersection planes 124 and 125 of the microstructure unit can also be regarded as the interface between the two different material layers, i.e., the total internal reflection layer 121 and the inner layer 122, wherein the total internal reflection layer 121 is the first material layer, and the inner layer 122 is the second material layer. In the cross section shown in FIG. 3, the plurality of microstructure units of the total internal reflection layer 121 are periodically arranged to form a structure of sawtooth shape; the inner layer 122 therefore has a corresponding structure of sawtooth shape. For example, the microlens layer 123 can be formed by manufacturing lens-structures on the incident side for the projection light rays of the transparent substrate layer 120, and a total internal reflection layer 121 with a microstructure array is formed on another side of the transparent substrate layer 120 with a process of coating resin on roll and then UV curing. The total internal reflection layer 121 uses resin material, which is usually epoxy resin glue series, acrylic glue series, polyester glue series, polyurethane glue series, polyimide glue series or the like. The inner layer 122 can be, for example, an air layer, a quartz layer, or a glass layer. It should be understood that FIGS. 2 and 3 show the case where the inner layer 122 is an air layer. In addition, FIG. 3 shows a case where a plurality of microstructure units of the total internal reflection layer 121 are periodically arranged. However, the microstructure units can also be arranged non-periodically, as long as they can form a structure of sawtooth shape.

A plurality of microlens units is formed in the microlens layer 123, and the plurality of microlens units form a microlens array. The arrangement of the microlens units corresponds to the arrangement of the microstructure units in the total internal reflection layer 121. For example, a plurality of microlens units can be arranged periodically or non-periodically. For clarity of illustration, FIG. 3 only shows 3 microstructure units and 4 microlens units. The microlens unit and the microstructure unit are at least partially staggered arranged, so that the microlens unit converges at least part of the projection light rays 31 onto the first plane 124 located on the lower side among the two intersecting planes 124 and 125 of the microstructure unit. The shape of lens of the microlens unit can be set to any known suitable shape of lens as required.

The shape of the microlens layer 123 and the relative position of the microlens layer 123 to the total internal reflection layer 121 can be adjusted so that as much projection light rays 31 as possible can be effectively incident on the total internal reflection layer 121. For example, when each microlens unit in the microlens layer 123 is a simple ball lens with a curvature of R, the focus of the paraxial light of the microlens unit can be calculated according to the following formula.

$$f = \frac{n_L R}{n_L - n_0} \quad (1)$$

Figure 4:
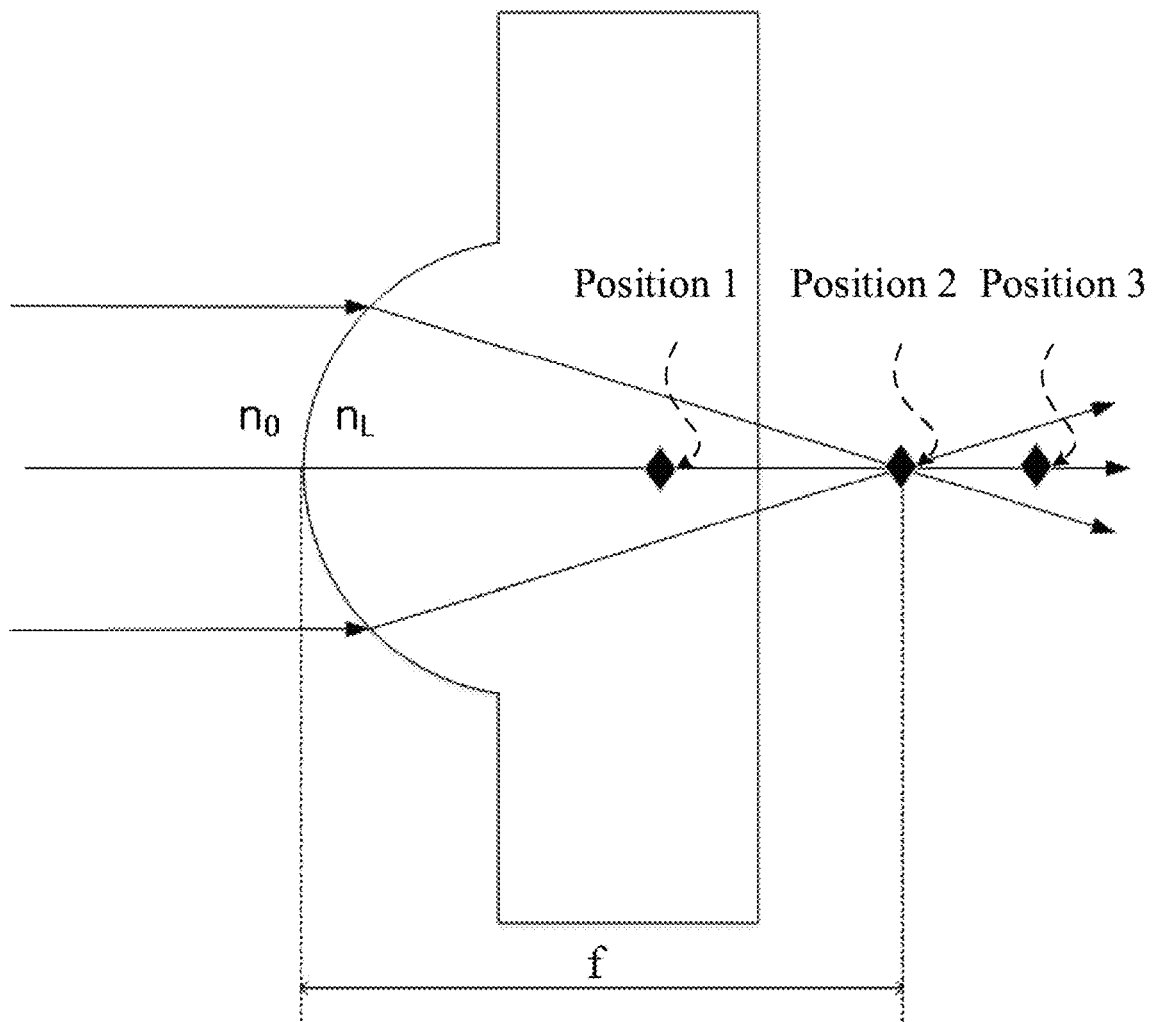
FIG. 4 is a schematic view showing a structural design of the microlens unit of a screen according to the present disclosure.

Here $n_L$ is the refractive index of the microlens layer, and $n_0$ is the refractive index of the medium (for example, the air) outside the microlens layer. In this case, the optical axis of the microlens unit preferably passes through the first plane 124 located on the lower side, and the distance between the first plane 124 and the microlens layer 123 can be adjusted as needed. As shown in FIG. 4, the position of the intersection line of the first plane 124 and the second plane 125 can be located at the focus point of the ball lens (i.e., position 2 shown by the diamond block in FIG. 4), or can be located outside and inside the focus position (position 1 and position 3 shown by the diamond block in FIG. 4). The distance in a direction of optical axis of the microlens unit of the microlens layer 123 from the outermost side of the microlens layer 123 (i.e., the intersection point of the arc and the optical axis of the microlens unit of the microlens layer 123) to the innermost vertex of the surface of the total internal reflection layer 121 (this point represents the intersection line of the corresponding first plane 124 and the second plane 125) is defined as d, then when the position of the first plane 124 is at position 2, f≈d; when the position of the first plane 124 is at position 1, f>d; when the position of the first plane 124 is at position 3, f<d. It is preferable that the total internal reflection layer 121 is located at the focus point of the lens of the microlens layer 123, that is, f≈d. Certainly, it can also be adjusted around this position according to actual demand, but generally, f and d should satisfy the relationship: f<3d.

As shown in FIG. 3, the projection light rays 31 from the projector below the screen incident to the microlens layer 123 firstly. The microlens layer 123 is used for changing the light path of the projection light rays 31 that are incident from the lower side at a larger incident angle approximately in parallel, so that at least part of the projection light rays 31 converged onto the lower plane 124 of the two inclined planes 124 and 125. The projection light rays 31 are totally internally reflected once at this plane, and is totally internally reflected at the upper inclined plane 125 once again, and then passes through the microlens layer 123, and is finally reflected to the field of view of a viewer, becoming the outgoing light rays 33 of screen 10. The ambient stray light 32 mainly comes from the ceiling lights in the room. In most cases, the ceiling light is far away from the rotation axis of the rotationally symmetric structure of the microstructure unit of the screen, and the incident angle of the ambient stray light rays 32 is much smaller than the incident angle of the projection light rays. Therefore, the ambient light 32 cannot satisfy the condition of total internal reflection on both the surface 124 and the surface 125, and most of it passes through the microstructure units and is absorbed by the light absorbing layer 11. Compared with the screen in prior art, the screen 10 according to the present disclosure is provided with a microlens layer 123 on the light incident side of the transparent substrate layer 120, so that it is easier for the optical path of the projection light rays originally incident at a large incident angle to meet the optical path requirements for two total internal reflections in the total internal reflection unit, which greatly reduces the loss of projection light rays caused by the incapability of resulting in a total internal reflection, improves the utilization of projection light rays, increases the screen gain, and achieve a brighter display image.

Figure 5:
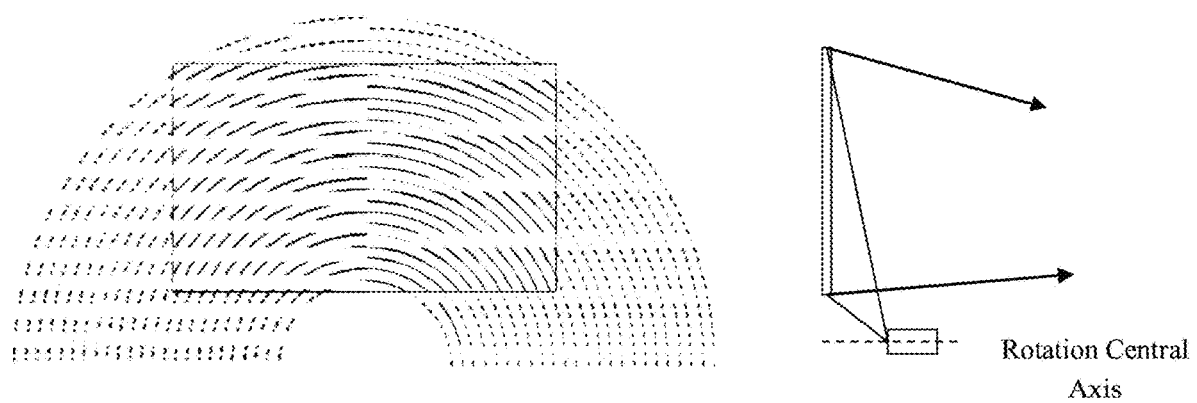
FIG. 5 is a schematic view showing the rotationally symmetric structure of the microstructure unit of the total internal reflection layer of a screen according to the present disclosure.
Figure 6:
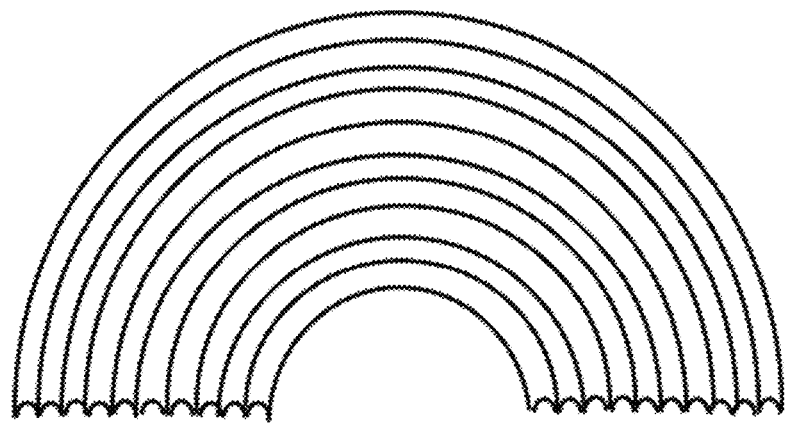
FIG. 6 is a schematic view showing the rotationally symmetric structures of the microlens unit of the microlens layer of a screen according to the present disclosure.

In the optical function layer 12, as shown in FIG. 5, the microstructure units of the total internal reflection layer 121 have an arrangement structure in a form of a rotationally symmetrical array on the screen plane. The rotation central (optical central) axis of the arrangement structure in a form of a rotationally symmetrical array is perpendicular to the screen plane and located below the screen. Preferably, a projector (not shown) is set at the rotation central axis. Therefore, in each microstructure unit of the total internal reflection layer 121, the total internal reflection layer 121 is a row of rotationally symmetric prisms formed on the surface of the transparent substrate layer 120. Correspondingly, the microlens layer 123 also has an arc-shaped and rotationally symmetric structure as shown in FIG. 6.

Figure 7:
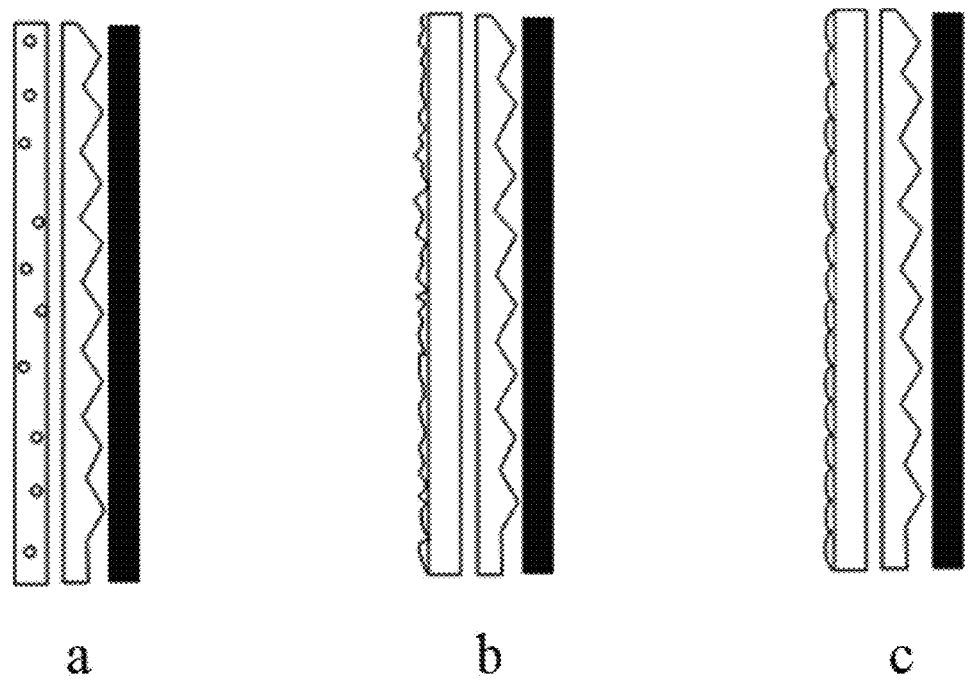
FIG. 7 is a structural schematic view of an example of the light diffusing layer of a screen according to the present disclosure.
Figure 8:
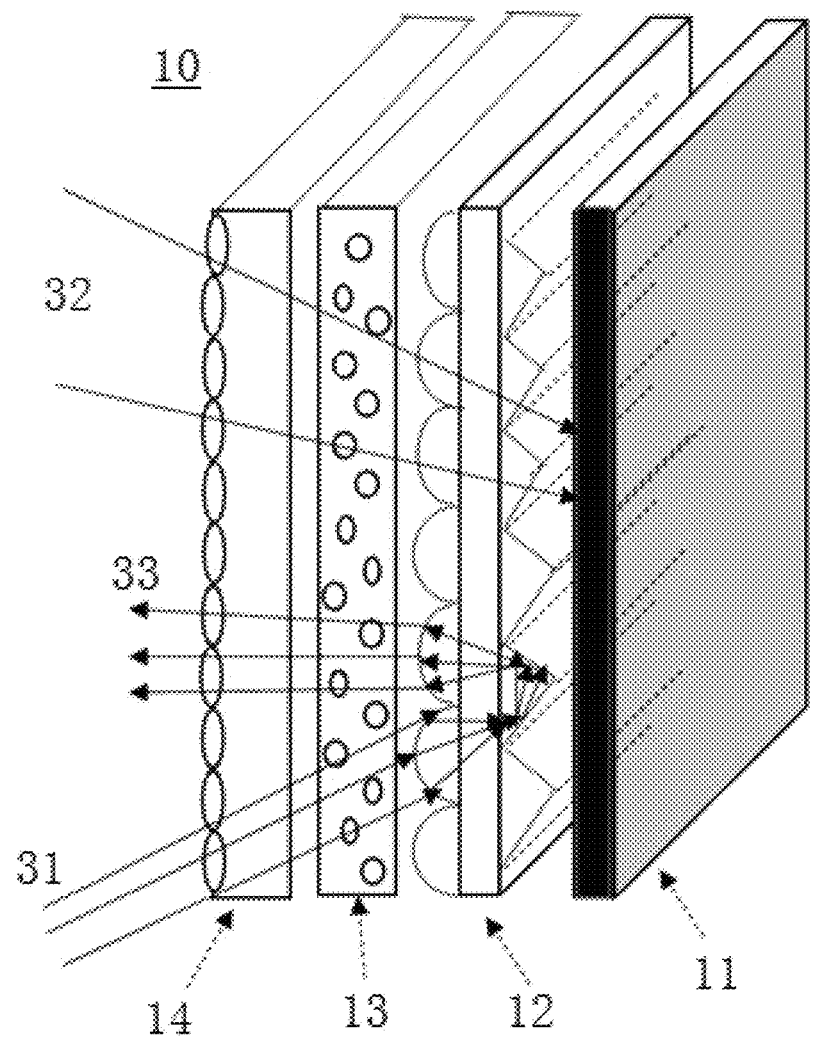
FIG. 8 is a structural schematic view of a screen according to the present disclosure.

In addition, in order to enable the screen 10 according to the present disclosure to have a larger visual angle, the screen 10 can also be provided with a light diffusing layer used for diffusing the projected light rays collimated by the total internal reflection layer 121. For example, a light diffusing layer can be formed by providing an optical scattering film on the outer side of the optical function layer 12. For example, FIG. 7 a~c (for convenience of illustration, this figure omits some other structures of the screen) show three commercial optical scattering film structures that can be used as such a light diffusing layer, respectively: volume scattering film, irregular surface scattering film and regular surface microlens array film. These types of scattering film materials can be used to increase the visual range of the screen, and can be used individually or stacked as needed. As an example, as shown in FIG. 8, the light diffusing layer comprises a volume diffusing layer 13 formed of a volume scattering film and a surface microstructure layer 14 formed of a surface microlens array film. Certainly, as described above, the number and types of the stacked light diffusing layers are not limited to those disclosed here. In the case of using such an optical scattering film as the light diffusing layer, the optical function layer and the light diffusing layer can be formed separately first, and then the light diffusing layer can be bonded to the outside of the microlens layer 123 through an optical bonding process.

Figure 9:
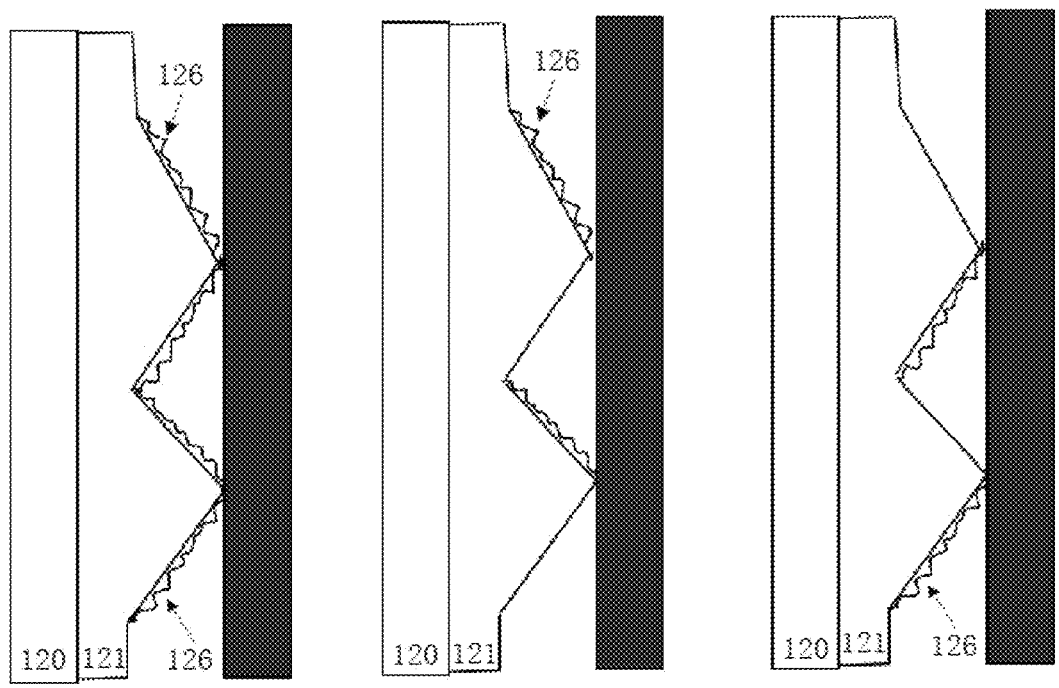
FIG. 9 is a structural schematic view of another example of the light diffusing layer of a screen according to the present disclosure.

In addition, the light diffusing layer can also be formed by providing a diffusing microstructure in the microstructure unit of the total internal reflection layer 121. As shown in FIG. 9, the microstructure diffusing layer 126 is provided on at least part of the surfaces of the two inclined planes 124 and 125 of the microstructure unit of the total internal reflection layer 121. Specifically, the left side of FIG. 9 shows that a microstructure diffusing layer is provided on the two intersecting planes of the microstructure unit, so as to achieve light rays output with a larger field of view. The middle and right side of FIG. 9 respectively show examples in which a microstructure diffusing layer is provided on one of the two intersection planes of the microstructure unit. It should be understood that, for the convenience of illustration, FIG. 9 only illustrates the transparent substrate layer 120, the total internal reflection layer 121, and the light absorbing layer 11 of the screen 10, and omits other structures. For example, the microstructure diffusing layer 126 can be formed by manufacturing diffusing microstructures or plating with an irregular scattering film on the surface of the two inclined planes 124 and 125 of the microstructure unit. The microstructure diffusing layer is used to enable both of total internal reflection and diffusion of the incident projection light rays 31 at the inclined plane of the total internal reflection layer 121. With such a structure, a separate diffusion layer is not needed to be additionally provided on the surface of the screen for the screen 10 according to the embodiment of the present disclosure. Instead, enables the microstructure unit of the total internal reflection layer 121 is enable to have a light diffusing function, thereby simplifying the structure of the screen.

Further, a protection layer can be provided on the outermost side of the screen 10 to prevent scratches or chemical corrosion. The protection layer can be one or more of a polyimide (PI) film, a polyester (PET) film, a polynaphthyl ester (PEN) film, a polyvinyl chloride (PVC) film, a polycarbonate (PC) film or a liquid crystal polymer (LCP) film, a glass plate, a PC plate, cloth, etc., such as a polynaphthyl ester (PEN) film on a glass plate. Certainly, other auxiliary function layers can also be provided according to design needs.

As described above, the screen 10 according to the embodiments of the present disclosure utilizes the angle-selective reflection characteristics of the optical function layer 12, so that the screen can automatically distinguish the projected light rays from the ambient light. In addition, by providing the microlens layer 123, the loss of projection light rays due to the inability of total internal reflection is greatly reduced, the utilization rate of the projection light rays is improved, and the screen gain is increased.

Figure 10:
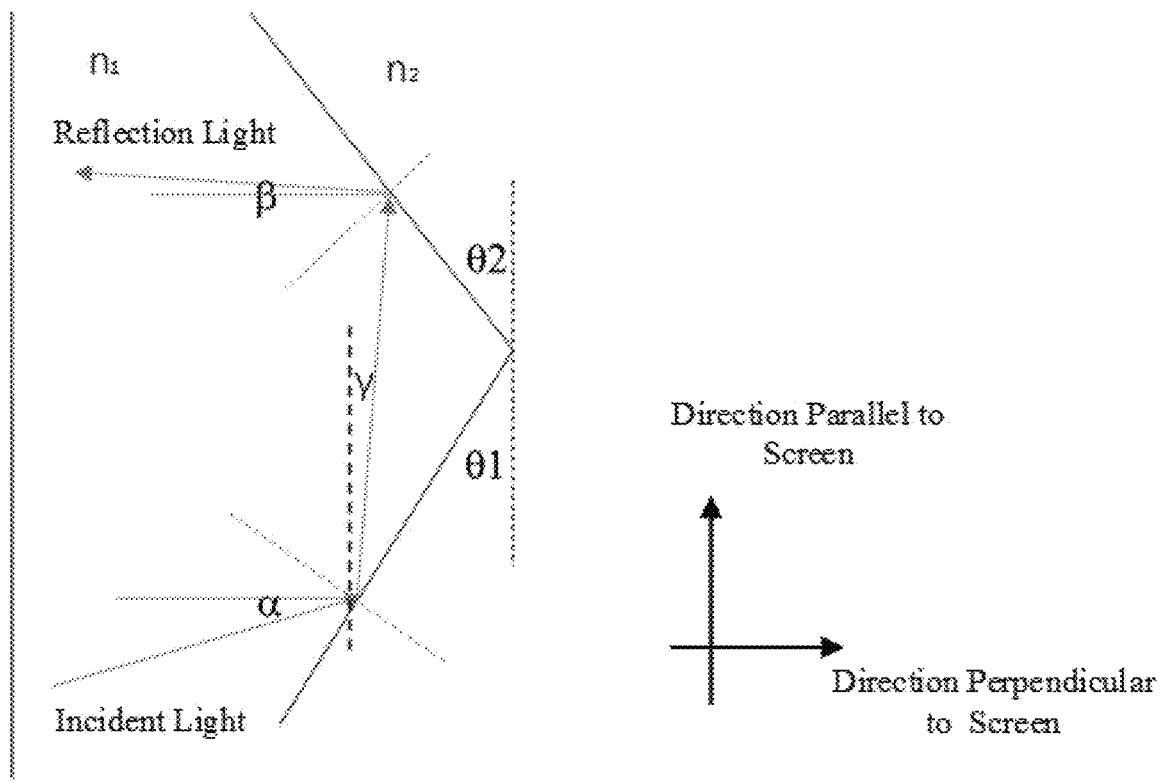
FIG. 10 shows an optical principle schematic view of the microstructure unit of a total internal reflection layer of a screen according to the present disclosure.

Optical Principle and Angle Selection of Total Internal Reflection Microstructure Unit FIG. 10 illustrates the optical principle of the total internal reflection microstructure unit of the screen according to an embodiment of the present disclosure. In order to facilitate analysis, the optimization of the optical path of the projection light rays by the microlens layer 123 and the microstructure diffusing layer 126 is not considered in the following discussion.

As shown in FIG. 10, the refractive index of the total internal reflection layer 121 is $n_1$ and the refractive index of the inner layer 122 is $n_2$, and the angles of the first plane 124 and the second plane 125 of the microstructure unit with respect to the screen plane (i.e., the vertical direction) are $\theta_1$ and $\theta_2$ (the unit is degree, the same below), respectively. The angles of the incident light ray and the reflected light ray with respect to the horizontal direction are $\alpha$ and $\beta$ (unit is degree, the same below). When the reflected light ray exits horizontally, $\beta$ is obviously 0 degree, and it is set as follows: when the reflected light ray is below the horizontal line (i.e., biased to the ground), $\beta$ is negative, and when the reflected light ray is above the horizontal line (i.e., biased to the ceiling), $\beta$ is a positive value. In order to enable the incident light ray from the projector to be totally internally reflected twice on the two inclined planes and then exits toward the viewer's eyes, according to the principle of geometric optics and the condition of total reflection, the following formula must be satisfied (2)~(4):

$$\theta_1 + \theta_2 = \frac{180 - (\alpha + \beta)}{2} \quad (2)$$

$$\cos(\theta_1 + \alpha) < \sqrt{1 - \left(\frac{n_2}{n_1}\right)^2} \quad (3)$$

$$\cos(\theta_2 + \beta) < \sqrt{1 - \left(\frac{n_2}{n_1}\right)^2} \quad (4)$$

Based on the above formulas (2)~(4), the values of $\theta_1$ and $\theta_2$ cannot be completely determined, and there is still a certain degree of design freedom. Assume that the angle between the intermediate light ray between the incident light ray and the outgoing light ray and the screen plane (that is, the vertical direction) is $\gamma$, and set that $\gamma$ is a positive value when the intermediate light ray is biased to the audience side, and $\gamma$ is a negative value when the intermediate light is biased away from the audience side. According to the principle of geometric optics and the optical condition of total reflection, it can be calculated:

$$\theta_1 = \frac{90 - \alpha - \gamma}{2} \quad (5)$$

$$\theta_2 = \frac{90 - \beta + \gamma}{2} \quad (6)$$

It can be seen from formulas (5) and (6) that as long as the optical paths of the incident light, the outgoing light rays and the intermediate light rays are determined (that is, $\alpha$, $\beta$ and $\gamma$ are determined), the inclination angles $\theta_1$ and $\theta_2$ of the two intersecting planes of the microstructure can be completely determined.

In addition, it can be seen from formulas (5) and (6) that even when the optical paths of the incident light ray and the outgoing light ray are determined, the optical path of the intermediate light ray can be adjusted according to different application requirements (that is, the value of $\gamma$ can be adjusted) so as to select the values of $\theta_1$ and $\theta_2$ within a certain range. For example, in the application of ultra-short-throw projection, the projector is located below the screen, so $\alpha > 0$ is always true; and since the audience's eyes are above the projector, in order to ensure that the emitted light rays enters the audience's eyes, $\alpha + \beta > 0$ is always true; in this case, it can be obtained from formula (2):

$$\theta_1 + \theta_2 < 90 \quad (7)$$

It can be seen from formula (5) that in the application of ultra-short-throw projection, the angle between the first plane 124 and the second plane 125 of the microstructure unit of the screen according to the present disclosure must be an obtuse angle.

Figure 11:
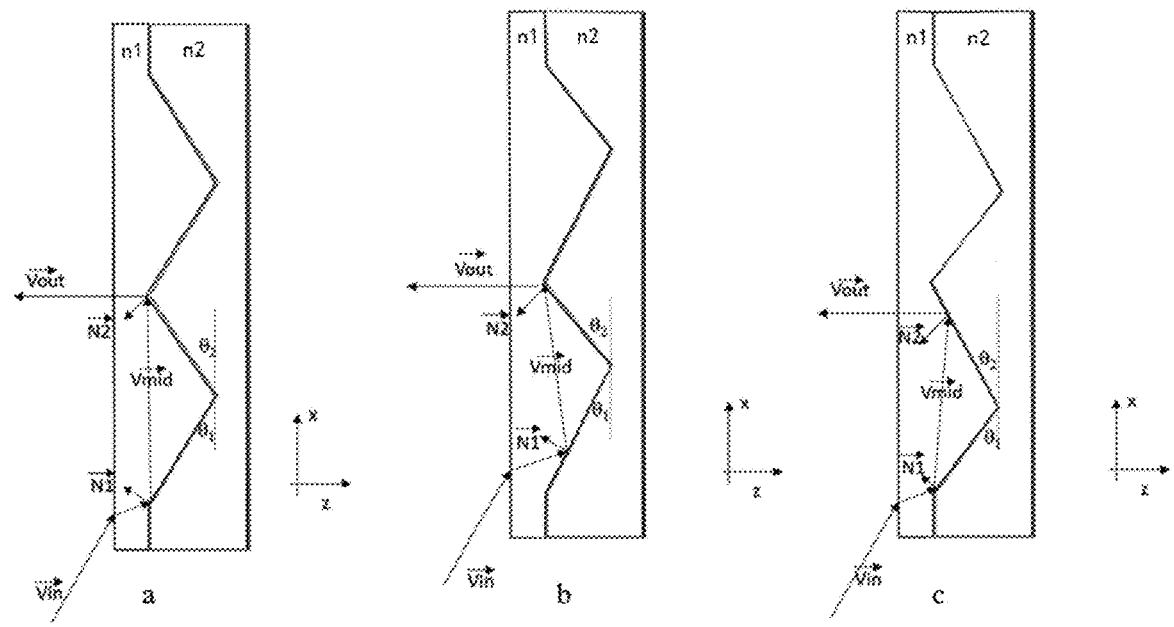
FIG. 11 is a schematic view of a relationship between the tilting angle of the microstructure unit and light path of a screen according to the present disclosure.

FIG. 11a shows a case of ideal light path, in which an incident projection light ray Vin is totally internally reflected by one inclined surface of the microstructure unit, and become an intermediate light ray $V_{mid}$, which goes along a direction parallel to the screen plane in the total internal reflection layer 121. And then $V_{mid}$ becomes an outgoing light ray $V_{out}$ which is parallelly output toward the viewer after being totally internally reflected by another inclined surface of the microstructure unit.

In the case shown in FIG. 11a, $\gamma = 0$ degree, $\beta = 0$ degree, when $\theta_2 = 45$ degrees, the emitted light ray emits perpendicular to the screen, i.e., $\beta = 0$ degree, and it can be seen that $\theta_1 < 45$ degrees according to the above formula (7), that is, $\theta_1 < \theta_2$.

However, non-ideal light paths cases as shown in FIGS. 11b and 11c may also occur in practical applications. In FIG. 11b, the incident light ray Vin is totally internally reflected by the first inclined surface of the microstructure unit to produce the intermediate light ray $V_{mid}$, but the traveling direction of $V_{mid}$ is not parallel to the screen plane, and is biased toward the viewer side (at this time $\gamma$ is a positive value). Therefore, part of the $V_{mid}$ may not be reflected by the second inclined surface but directly emitted, and the first inclined surface of the microstructure unit cannot be fully utilized. In FIG. 11c, the incident light ray Vin is totally internally reflected by the first inclined surface of the microstructure unit to produce the intermediate light ray $V_{mid}$. The traveling direction of $V_{mid}$ is biased away from the viewer side (at this time, $\gamma$ is negative) instead of parallel to the screen plane. Therefore, the second inclined surface of the microstructure unit cannot be fully utilized.

Figure 12:
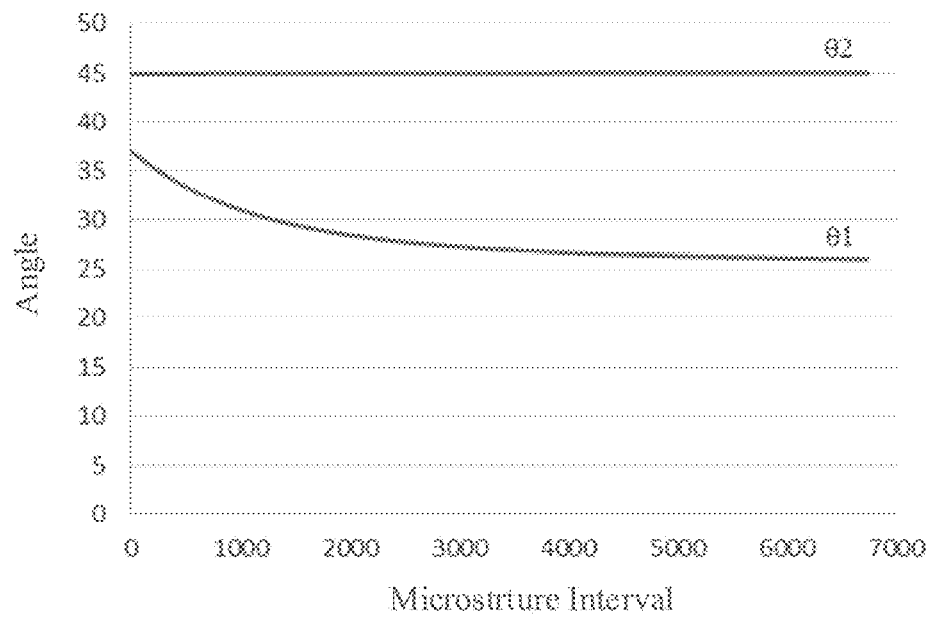
FIG. 12 shows a simulation example of an optical angle of the microstructure unit of a screen according to the present disclosure.
Figure 12:
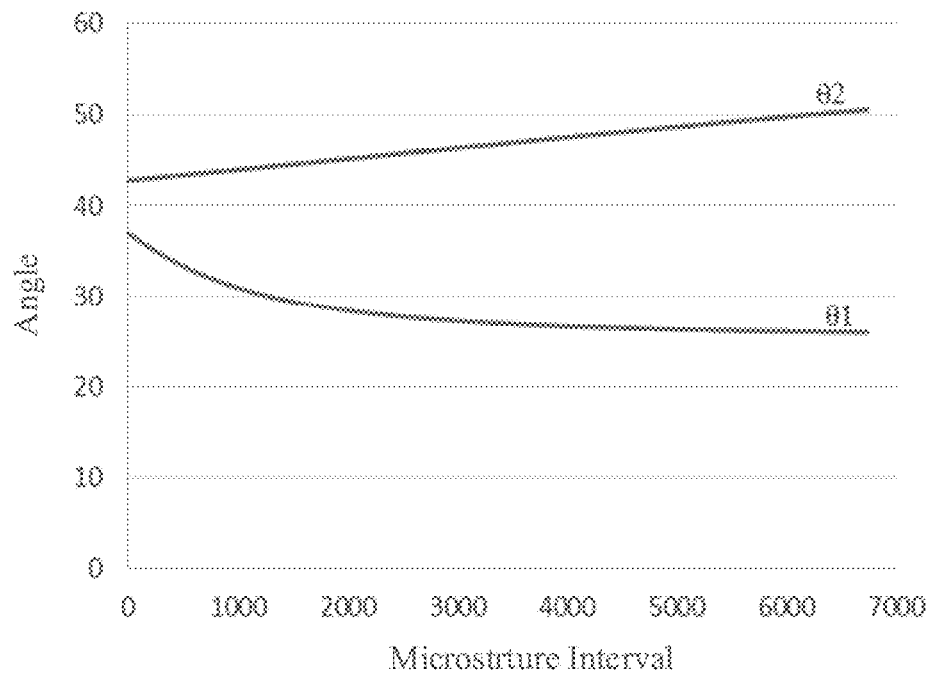

In addition, as described above, the screen 10 according to the present disclosure has a rotationally symmetric structure and comprises a plurality of microstructure units. Therefore, the angle of each microstructure unit can be designed to be same or different. For example, FIG. 12 illustrates a simulation example of the optical angle of the microstructure unit of the screen according to the present disclosure. The focus point of the screen shown in FIG. 12a is located at infinity, that is to say, for all the microstructure units of the screen, each of the emitted light rays horizontally emits in a direction toward the viewer, so $\beta = 0$ degree and $\theta_2 = 45$ degrees are always true. According to the simulation results, the $\theta_1$ of the microstructure unit gradually decreases as it approaching the top of the screen, and $\theta_1 < \theta_2$, thus satisfying the above formula (7). In the screen shown in FIG. 12b, the focus point of the screen is no longer at infinity. In this case, along a direction from the center of the screen to the edge of the screen, the value of $\theta_1$ of the microstructure unit of the screen continuously decreases and the value of $\theta_2$ continuously increases.

Refractive Index Selection of Total Internal Reflection Layer and Inner Layer

Figure 13:
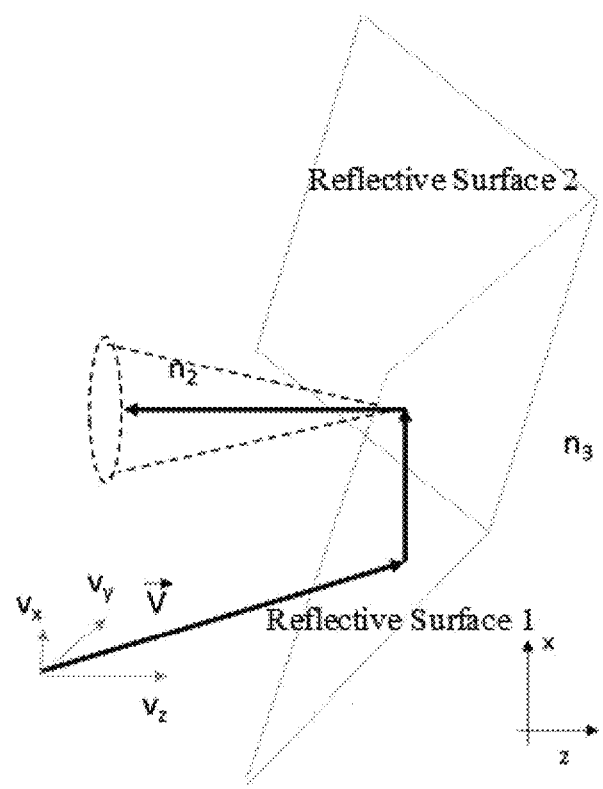
FIG. 13 is a schematic view of a relationship of refractive index of material between the total internal reflection layer and inner layer of a screen according to the present disclosure.
Figure 13:
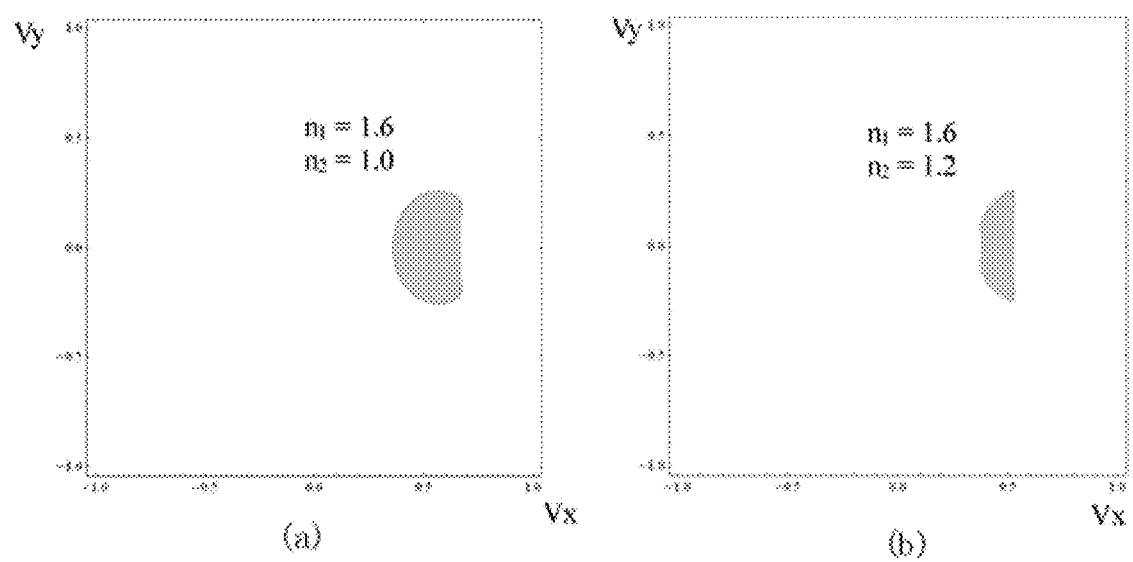

In addition to the values of $\theta_1$ and $\theta_2$, it can be seen from the formula for total optical reflection that a total internal reflection microstructure unit that meets conditions for two total internal reflections is also affected by the refractive index $n_1$ of the total internal reflection layer 121 and the refractive index $n_2$ of the inner layer 122. The total internal reflection layer 121 of the screen according to the present disclosure is usually made of transparent resin material, and its refractive index is in the range of 1.3 to 1.7. Alternatively, the total internal reflection layer 121 can also be made of other materials with similar refractive index. In addition, the material of the total internal reflection layer 121 can also be doped with scattering ions or absorbing materials. Therefore, in order to satisfy the condition of total internal reflection, the selection of the refractive index $n_2$ of the inner layer 122 needs to be considered. FIG. 13 shows the influence of the different value of refractive index $n_2$ of the inner layer 122 on the total internal reflection area of the incident light rays of the microstructure unit. As shown in a of FIG. 13, the incident light ray V can be expressed as ($V_x$, $V_y$, $V_z$), where the z axis is perpendicular to the screen, and the X and Y axes are parallel to the screen. Obviously, the total internal reflection area of the incident light ray depends on the value range of $V_x$ and $V_y$. $V_z$ meets:

$$V_z = \sqrt{1 - V_x^2 - V_y^2} \quad (8)$$

Assuming that the emitted light ray exits towards the viewer's eyes and the refractive index $n_1$ of the total internal reflection layer 121 is 1.6, the change trend of the value range of the components ($V_x$, $V_y$) of the incident light ray satisfying the total internal reflection condition changing with the refractive index $n_2$ of the inner layer 122 can be obtained according to the above formulas (3) and (4). As shown in FIG. 13b, the area of the incident light ray satisfying total internal reflection on both inclined surfaces of the microstructure unit is continuously reduced as $n_2$ increases. In other words, the probability that the light rays from the projector cannot be totally internally reflected twice on the two inclined surfaces of the microstructure unit increases as $n_2$ increases. Therefore, in order to ensure a certain screen reflection efficiency, $n_1$ and $n_2$ need to satisfy:

$$n_2 < n_1 - 0.2 \qquad (9)$$

When the above condition is satisfied, the inner layer 122 is preferably an air layer.

Embodiment of the Optical Functional Layer

Figure 14:
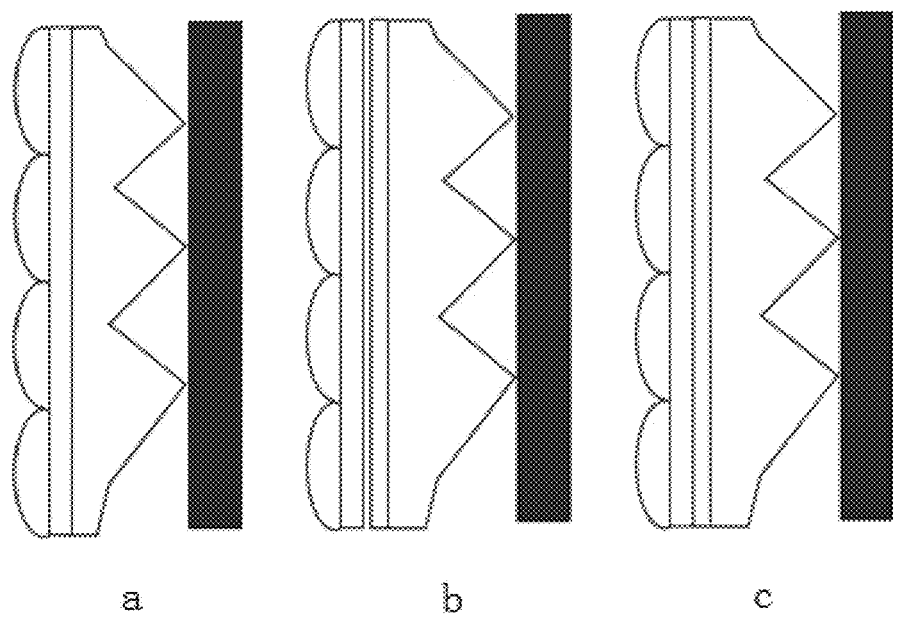
FIG. 14 shows a specific embodiment of the processing of a screen according to the present disclosure.

Hereinafter, an embodiment of the optical function layer of the screen according to the present disclosure will be described with reference to FIG. 14.

FIG. 14a shows the first embodiment of the optical function layer of the screen according to the present disclosure. As shown in this figure, the microlens layer 123, the transparent substrate layer 120 and the total internal reflection layer 121 can be formed of the same substrate. For example, PET is used as the material of the transparent substrate layer 120, a microlens array is manufactured to form the microlens layer 123 on one side of the PET substrate facing the audience, and a microstructure array of prisms is manufactured on the other side of the PET substrate with a process of coating resin on roll and UV curing to be used as a prism-microstructure array as the total internal reflection layer 121.

FIG. 14b and FIG. 14c show a second embodiment of the optical function layer of the screen according to the present disclosure. In this case, the microlens layer 123 is formed separately relative to the transparent substrate layer 120 and the total internal reflection layer 121, and combined the layers by optical bonding or mechanical fixing. The material of the microlens layer 123 can be the same as or different from the transparent substrate layer 120. In particular, the materials of the microlens layer 123, the transparent substrate layer 120, and the total internal reflection layer 121 can be different from each other.

Although the screen and projection system according to the present disclosure have been described above with reference to the accompanying drawings, the present disclosure is not limited to this. Moreover, those skilled in the art should understand that various changes, combinations, sub-combinations and modifications can be made to the above-mentioned embodiments without departing from the essence or scope defined by the appended claims of the present disclosure.

What is claimed is:

1. A screen, which is capable of reflecting projection light rays from a projector to a field of view of a viewer, wherein the screen comprises a microlens layer, a transparent substrate layer, a total internal reflection layer and a light absorbing layer which are sequentially stacked from an incident side of the projection light rays, wherein the light absorbing layer is capable of absorbing light transmitted through the microlens layer, the transparent substrate layer and the total internal reflection layer, wherein the microlens layer comprises a plurality of microlens units;

wherein the total internal reflection layer comprises a plurality of microstructure units, each of which has a first plane on the lower side and a second plane on the upper side, wherein the first plane intersects with the second plane, and the plurality of microstructure units form a structure of a sawtooth shape; and the microlens units are at least partially interlaced with the microstructure units such that the microlens units converge at least a portion of the projected light rays to the first plane, and the portion of the projection light rays converged onto the first plane exits after two consecutive total internal reflections on the first plane and the second plane.

2. The screen according to claim 1, wherein the total internal reflection layer has a rotationally symmetric structure corresponding to a rotationally symmetric structure of the microlens layer.

3. The screen according to claim 2, a rotation central axis of the total internal reflection layer and a rotation central axis of the microlens layer each is perpendicular to a plane of the screen and located below the screen.

4. The screen according to claim 2, wherein the rotationally symmetric structure of the microlens layer has an arc-shape.

5. The screen according to claim 1, wherein a focal length of the microlens unit is f, a distance between an intersection point of an arc of the microlens unit with an optical axis of the microlens unit and an intersection line of the first plane and the second plane is d in a direction of an optical axis, and f and d satisfy a relationship of f<3d.

6. The screen according to claim 5, wherein f≈d.

7. The screen according to claim 1, wherein the screen is further provided with a light diffusing layer, which is a microstructure diffusion layer provided on at least one of the first plane and the second plane of the microstructure unit.

8. The screen according to claim 1, wherein the light absorbing layer is a black material layer absorbing light.

9. The screen according to claim 1, wherein the microlens layer, the transparent substrate layer and the total internal reflection layer are integrally formed of a same PET substrate.

10. The screen according to claim 1, wherein the materials of the microlens layer, the transparent substrate layer, and the total internal reflection layer are different from each other.

11. The screen according to claim 1, wherein the screen further comprises an inner layer located between the total internal reflection layer and the light absorbing layer, and having a structure of a sawtooth shape that matches the microstructure units of the total internal reflection layer, wherein a refractive index m of the total internal reflection layer and a refractive index $n_2$ of the inner layer satisfy a relationship of $n_2 < n_1 - 0.2$.

12. The screen according to claim 11, wherein the inner layer is at least one of an air layer, a quartz layer and a glass layer.

13. The screen according to claim 1, wherein the individual microstructure units of the total internal reflection layer are provided as rotationally symmetric total internal reflection prisms, and wherein angles of the first plane and the second plane of the microstructure unit with a plane of the screen are $\theta_1$ and $\theta_2$, respectively, which satisfy a relationship of $\theta_1 + \theta_2 < 90$.

14. The screen according to claim 13, wherein in the plurality of microstructure units, each of the $\theta_1$ is a different angle and each of the $\theta_2$ is equal to 45 degrees.

15. The screen according to claim 13, wherein in the plurality of microstructure units, each of the $\theta_1$ is a different angle from others, and each of the $\theta_2$ also is a different angle from others.

16. The screen according to claim 1, wherein the screen is further provided with an optical diffusion film, which is provided on the incident side of the projection light of the microlens layer.

17. A projection system, comprising a projector and the screen, which is capable of reflecting projection light rays from a projector to a field of view of a viewer, wherein the screen comprises a microlens layer, a transparent substrate layer, a total internal reflection layer and a light absorbing layer which are sequentially stacked from an incident side of the projection light rays, wherein the light absorbing layer is capable of absorbing light transmitted through the microlens layer, the transparent substrate layer and the total internal reflection layer, wherein the microlens layer comprises a plurality of microlens units:

wherein the total internal reflection layer comprises a plurality of microstructure units, each of which has a first plane on the lower side and a second plane on the upper side, wherein the first plane intersects with the second plane and the plurality of microstructure units form a structure of a sawtooth shape; and the microlens units are at least partially interlaced with the microstructure units such that the microlens units converge at least a portion of the projected light rays to the first plane, and the portion of the projection light rays converged onto the first plane exits after two consecutive total internal reflections on the first plane and the second plane.

18. The projection system according to claim 17, wherein the total internal reflection layer has a rotationally symmetric structure corresponding to a rotationally symmetric structure of the microlens layer.

19. The projection system according to claim 17, wherein a focal length of the microlens unit is f, a distance between an intersection point of an arc of the microlens unit with an optical axis of the microlens unit and an intersection line of the first plane and the second plane is d in a direction of an optical axis, and f and d satisfy a relationship of f<3d.

20. The projection system according to claim 17, wherein the individual microstructure units of the total internal reflection layer are provided as rotationally symmetric total internal reflection prisms, and wherein angles of the first plane and the second plane of the microstructure unit with a plane of the screen are $\theta_1$ and $\theta_2$, respectively, which satisfy a relationship of $\theta_1+\theta_2<90$.

* * * * *